United States Patent

[11] 3,578,006

| [72] | Inventor | Andrew J. Betz, Jr.<br>Adelphi, Md. |
|---|---|---|
| [21] | Appl. No. | 819,286 |
| [22] | Filed | Apr. 25, 1969 |
| [45] | Patented | May 11, 1971 |
| [73] | Assignee | The United States of America as represented by the Secretary of the Navy |

[54] ACCELERATION AND PRESSURE RESPONSIVE FLUID VALVE
10 Claims, 1 Drawing Fig.

[52] U.S. Cl. .................................................. 137/38, 73/515, 137/467
[51] Int. Cl. .................................................. F16k 17/36
[50] Field of Search .................................................. 137/38, 36, 467; 73/515

[56] References Cited
UNITED STATES PATENTS

| 1,669,534 | 5/1928 | Rabitz | 137/467X |
|---|---|---|---|
| 2,217,880 | 10/1940 | Woodson | 137/467 |
| 2,453,812 | 11/1948 | Phelan | 137/38X |
| 2,772,686 | 12/1956 | Versoy | 137/39 |
| 3,078,722 | 2/1963 | Kongelbeck | 73/515X |
| 3,105,506 | 10/1963 | Beeby | 137/38 |
| 3,317,250 | 5/1967 | Martin | 137/38X |
| 3,263,698 | 2/1966 | Siggelin | 137/467 |
| 3,384,111 | 5/1968 | Webb | 137/467X |

Primary Examiner—Clarence R. Gordon
Attorneys—J. O. Tresansky, R. S. Sciascia and J. A. Cooke ABSTRACT: An acceleration and pressure responsive fluid valve for a conduit having a fluid blocking body held in place in the conduit by ball detents. The balls are held in locking position by a spring loaded piston which under high fluid pressure, moves against the spring out of ball locking position to allow the balls to pop into the body out of locking position which frees the body to be pushed out of blocking position in the conduit. The fluid which operates the piston enters the body through fluid spiracles which are closed during acceleration by an inertia operated valve, but opened again by a biasing spring when the acceleration decreases below a given value, thereby permitting fluid to flow through the spiracles to operate the piston and unlock the valve.

PATENTED MAY 11 1971
3,578,006
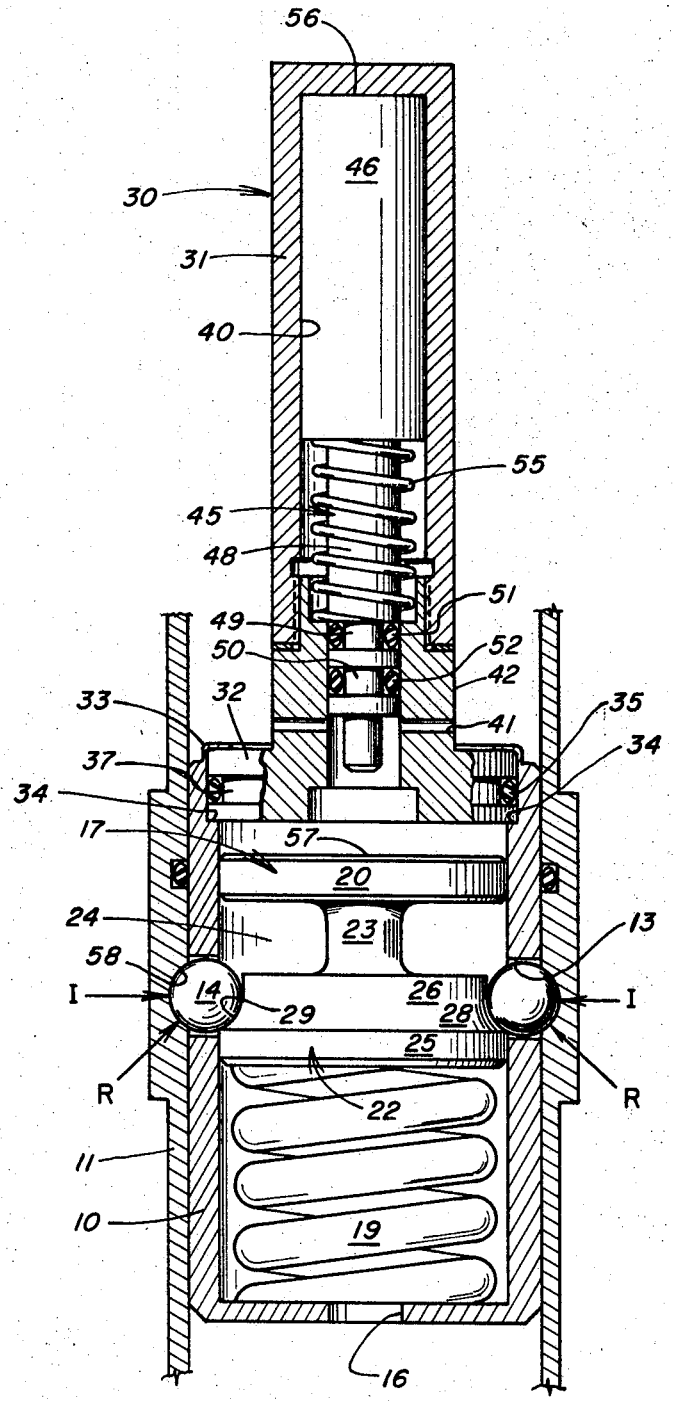
INVENTOR
Andrew J. Betz, Jr.
BY
J. O. Tresansky
ATTORNEY

ACCELERATION AND PRESSURE RESPONSIVE FLUID VALVE

BACKGROUND OF THE INVENTION

This invention relates generally to acceleration force and fluid pressure responsive valves and more specifically to fluid valves that are bodily insertable into a conduit.

Valves of this kind find particular application in moving vehicles, such for example as rockets, in which it is desired to block fluid flow in a conduit during acceleration of the vehicle, but to permit completely unobstructed fluid flow in the conduit when acceleration of the vehicle has decreased below a certain value, for example at motor burnout of the rocket.

The valves presently available to fulfill this function are somewhat cumbersome, complicated, expensive and unreliable. They often require external sources of power for actuation, thereby increasing the cost and generally decreasing the reliability of the system. Moreover, when actuated their mounting and supporting structure remains as a significant obstruction to the free flow of fluid in the conduit. Also, the mechanism for holding the valve open occasionally fails thereby permitting the valve to close and block any further fluid flow in the conduit. On occasion present day valves open prematurely before acceleration has sufficiently decreased resulting in less than optimum performance. Finally the existing valves are seldom suitable to withstand the high pressures encountered and either open prematurely or jam in a closed position.

Consequently a need has long existed for a simple, compact and reliable fluid valve that will remain closed during acceleration despite exceedingly high fluid pressures, and will positively open to permit unobstructed fluid flow when the acceleration decreases below a given value and the fluid pressure exceeds a given magnitude.

SUMMARY OF THE INVENTION

Accordingly, one object of this invention is to provide a new and improved acceleration and pressure responsive fluid valve.

Another object of the invention is to provide a new and improved acceleration and pressure responsive fluid valve that is simple, compact, relatively inexpensive and highly reliable.

Yet another object of the instant invention is to provide a new and improved acceleration and pressure responsive fluid valve which will open only in response to fluid pressure above a predetermined magnitude and when acceleration is below a predetermined magnitude.

A further object of the present invention is to provide a new and improved fluid valve that will open to permit completely unobstructed flow of fluid.

A yet further object of the invention is to provide a new and improved acceleration and pressure responsive valve which is completely automatic and self-contained.

In accordance with this invention these and other objects are attained by a valve assembly positionable within a fluid carrying conduit having a plurality of detent members urged by a biased member to project outwardly into locking engagement with the conduit and a slidable member which in response to an accelerating force of a predetermined magnitude operates to obstruct fluid communication between the conduit and the biased member until the acceleration decreases, and then operates to establish fluid communication therebetween to overcome the biased member and permit recession of the detent members thereby releasing the valve assembly from its locked engagement with the conduit.

BRIEF DESCRIPTION OF THE DRAWING

A more complete appreciation of the invention and its many attendant advantages will develop as it becomes better understood by reference to the following detailed description of a preferred embodiment when considered together with the accompanying solitary view thereof which is an elevation view, partly in section, of the valve.

DETAILED DESCRIPTION OF PREFERRED EMBODIMENT

The valve assembly of the present invention is shown as having a cup-shaped casing 10 of a diameter to permit slidable insertion into a conduit 11 which carries a fluid, such as air, under pressure. The conduit may be part of a vehicle such as a rocket, and the valve assembly is used to block the fluid flow in the conduit until the fluid pressure exceeds a predetermined magnitude and the vehicle acceleration falls below a predetermined rate.

The sidewall of casing 10 is provided with a plurality of ports, or apertures, 13 within which detent balls 14 are positioned. An aperture 16 is centrally formed in the base of casing 10. The outer periphery of detent ports 13 are swaged inwardly to prevent detent balls 14 from passing completely out of the ports 13 during assembly, although permitting partial protrusion of the balls beyond the casing 10. Slidably disposed within casing 10 is a piston 17, held in position against rearward movement by a coil spring 19 positioned between the rear of piston 17 and the base of casing 10. Piston 17 is formed of enlarged end portions 20 and 22 separated by a reduced diameter portion 23 which provides a surrounding annular space or recess 24 capable of accommodating detent balls 14 as will be explained more fully hereinafter. The bottom end portion 22 is formed of a lower cylindrical portion 25 and an upper cylindrical portion 26 joined by a central truncated cuspal portion 28 having an arcuate bevel 29. Coil spring 19 prevents rearward movement of piston 17 and the upper cylindrical portion 26 and truncated cuspal portion 28 of bottom end portion 22 provide a bearing surface which prevents the recession of detent balls 14 into the casing 10.

When the fluid pressure acting on the forward face of the head end portion 20 of piston 17 is sufficient to overcome the force of coil spring 19, the piston will move rearwardly until upper cylindrical portion 26 is displaced out of ball blocking position and detent balls 14 will pop into the annular recess 24 around the reduced portion 23 of the piston 17. Once the balls 14 have receded into casing 10 the valve assembly is free to slide rearwardly in conduit 11 out of its fluid blocking position.

Seated atop the open end of casing 10 is an elongate tubular housing 30 composed of two threadedly interconnected members, cap member 31 and base member 32. Housing 30 is secured to casing 10 on internal shoulder 34 provided on the rim of casing 10 on which housing 30 is seated. The top rim 33 of casing 10 is reduced in thickness and is peened over the top of base member 32 to securely hold housing 30 in place against shoulder 34. A sealing ring 35 is fit into a peripheral groove 37 in base member 32 to provide a hermetic seal between housing 30 and casing 10.

Housing 30 is provided with an axial bore 40 opening into casing 10 and a plurality of fluid passages or spiracles 41 extending radially through the cylindrical wall 42 of base member 32 to provide fluid communication between the conduit 11 and bore 40. A piston member 45 having a enlarged head portion 46 and a shank portion 48 is slidably disposed within bore 40. Head portion 46 may be integrally attached to shank portion 48 or may be formed of one or more separate and removable sections to give a capability for adjusting the acceleration level at which the valve will open, as will be explained more fully hereinafter.

Shank portion 48 is provided with two peripheral grooves 49 and 50 for receiving individual pressure seals such as O-rings 51 and 52. A coil spring 55 encircling shank portion 48 and pressing forwardly against piston head 46 normally maintains piston 45 in the position illustrated wherein both of pressure sealing members 51 and 52 are forward of spiracles 41 thereby permitting fluid communication between conduit 11 and the concavity formed by casing 10.

Upon forward acceleration of the vehicle of which conduit 11 is a part, the inertia force of head portion 46 will act against coil spring 55, compressing it and permitting rearward movement of shank portion 48. At its fully displaced rearward position, portion 48 seals spiracles 41 with pressure seals 51 and 52 being disposed above and below spiracles 41 thereby interrupting fluid communication. Seal 52 prevents pressure buildup in the interior of casing 10 to preclude premature opening of the valve assembly. Seal 51 prevents pressure buildup within cap member 31 which would act against the forward face 56 of head portion 46 and slow the return of piston 45 when acceleration decreases.

When acceleration decreases below a predetermined magnitude sufficient for coil spring 55 to overcome the inertia force of head portion 46, coil spring 55 will push piston 45 forwardly to uncover spiracles 41 and thereby establish fluid communication between conduit 11, through pressure bore 40 to the concavity of casing 10 and equalize fluid pressure therebetween. Pressure acting in casing 10 against the forward face of piston 17 moves piston 17 rearwardly against coil spring 19 thereby displacing bottom end portion 22 rearwardly and aligning the reduced portion 23 with detent ports 13. Aperture 16 vents the portion of casing 10 to the rear of piston 17 to preclude pressure increase therein due to the rearward movement of piston 17. When reduced portion 23 is aligned with detent ports 13, detent balls 14 are released to pop into the annular recess 24.

The fluid pressure in the conduit forward of the valve assembly exerts a force on the valve assembly which is reacted by the conduit at the recesses 58 which receive the protruding portions of the detent balls. This reaction force R exerted by conduit 11 on the valve assembly acts through detent balls 14, and because of the shape and position of the balls 14 there is an inward component of force I on the balls which is sufficient to displace them into annular recess 24 when the reduced portion 23 is aligned with detent ports 13.

When detent balls 14 pop into casing 10 the valve assembly is released to be pushed rearwardly in the conduit out of fluid blocking position, for example into a notch in the conduit or out of the open end of the conduit altogether.

The acceleration at which the inertia force on piston 45 and the force of the return spring are equal may be adjusted by varying the force constant of the coil spring 55 or by varying the mass of head portion 46. The fluid pressure at which piston 17 will move to release detents 14 may be adjusted by varying the force constant of coil spring 19.

Obviously numerous variations and modifications of the above-described best mode or preferred embodiment of the invention, defined by the appended claims may be made.

What is claimed as new and desired to be secured by Letters Patent of the United States is:

I claim:

1. A valve assembly comprising:
   a casing having at least one aperture formed in the sidewall thereof,
   detent means positioned in said aperture,
   first slidable means disposed in said casing normally holding said detent means projecting beyond said casing and movable in response to fluid pressure of a predetermined magnitude to permit said detent means to recede into said casing,
   at least one passage formed in said casing for providing fluid communication between said slidable means and the exterior of said casing,
   second slidable means disposed in said casing for interrupting said fluid communication in response to an inertia force of a predetermined magnitude, and
   biasing means acting on said second slidable means in opposition to said inertia force to reestablish said fluid communication when said inertia force has decreased below said predetermined magnitude.

2. The valve of claim 1 wherein:
   said first slidable means comprises a first piston slidably mounted in said casing and movable in response to said fluid pressure,
   and further comprising resilient means disposed to act on said first piston in opposition to said movement.

3. The valve of claim 2 wherein said piston comprises a forward and a rearward portion separated by a central reduced portion defining therebetween an annular space of a size sufficient to receive said detent means upon recession of said detent means into said casing.

4. The valve of claim 3 wherein said rearward portion includes a reduced diameter portion adjacent said central reduced portion and which provides a bearing surface which holds said detent means protruding beyond said casing.

5. The valve of claim 1 wherein:
   said fluid passage comprises
   means defining a central bore communicating with said first slidable means
   means defining at least one fluid spiracle communicating between the exterior of said casing and said central bore;
   and said second slidable means comprises means movable in said bore between a spiracle closing position and a spiracle opening position.

6. The valve of claim 5 wherein said movable means comprises a second piston slidably mounted in said bore and having an inertia mass operatively associated therewith, and
   said biasing means acts on said second piston to bias said second piston toward said spiracle opening position,
   whereby under acceleration said inertia mass will act against said biasing means to move said second piston to said spiracle closing position, and when the acceleration has decreased to said predetermined magnitude said biasing means will act on said second piston to move said second piston to said spiracle opening position.

7. The valve of claim 6 wherein said second piston has at least two peripheral sealing means located thereon such that in said spiracle closing position one of said sealing means will be positioned between said spiracle and said first slidable means and the other sealing means will be located between said spiracle and the top of said second piston,
   whereby with said second piston in said spiracle closing position, fluid pressure will be prevented from acting on said first slidable means and also from altering the resultant force acting on said second piston.

8. The valve of claim 5 wherein:
   said first slidable means comprises a first piston slidably mounted in said casing and movable in response to said fluid pressure,
   and further comprising resilient means disposed to act on said first piston in opposition to said movement.

9. The valve of claim 6 wherein:
   said first slidable means comprises a first piston slidably mounted in said casing and movable in response to said fluid pressure,
   and further comprising resilient means disposed to act on said first piston in opposition to said movement.

10. The valve of claim 9 wherein:
    said first piston comprises a forward and a rearward portion separated by a central reduced portion defining therebetween an annular space of a size sufficient to receive said detent means upon recession of said detent means into said casing.